(12) United States Patent
Luo et al.

(10) Patent No.: US 11,101,933 B2
(45) Date of Patent: Aug. 24, 2021

(54) METHODS AND SYSTEMS FOR LOW LATENCY WIRELESS COMMUNICATION WITH A SCALABLE HIERARCHIAL ARCHITECTURE

(71) Applicant: INPLAY, Inc., Irvine, CA (US)

(72) Inventors: Xiaoyang Luo, Ladera Ranch, CA (US); Qun Wu, Irvine, CA (US)

(73) Assignee: InPlay, Inc., Irvine, CA (US)

( * ) Notice: Subject to any disclaimer, the term of this patent is extended or adjusted under 35 U.S.C. 154(b) by 0 days.

(21) Appl. No.: 15/716,236

(22) Filed: Sep. 26, 2017

(65) Prior Publication Data
US 2018/0098263 A1 Apr. 5, 2018

Related U.S. Application Data

(60) Provisional application No. 62/402,916, filed on Sep. 30, 2016, provisional application No. 62/402,936, (Continued)

(51) Int. Cl.
| | |
|---|---|
| *H04W 56/00* | (2009.01) |
| *H04W 40/24* | (2009.01) |
| *H04W 40/02* | (2009.01) |
| *H04L 12/717* | (2013.01) |
| *H04W 28/02* | (2009.01) |

(Continued)

(52) U.S. Cl.
CPC ............ *H04L 1/1621* (2013.01); *G06F 3/011* (2013.01); *H04L 1/1628* (2013.01); *H04L 1/1635* (2013.01); *H04L 1/1664* (2013.01); *H04L 1/1671* (2013.01); *H04L 45/42* (2013.01); *H04W 28/0273* (2013.01); *H04W 40/02* (2013.01); *H04W 56/001* (2013.01); *H04W 40/244* (2013.01)

(58) Field of Classification Search
CPC ... H04L 1/1621; H04L 1/1664; H04L 1/1628; H04L 1/1635; H04L 1/1671; H04L 45/42; H04W 56/001; H04W 40/244; H04W 40/02; H04W 28/0273; G06F 3/011
See application file for complete search history.

(56) References Cited

U.S. PATENT DOCUMENTS

| | | | |
|---|---|---|---|
| 2006/0268908 A1* | 11/2006 | Wang | H04L 47/14 370/401 |
| 2009/0147709 A1* | 6/2009 | Muqattash | H04B 17/24 370/310 |

(Continued)

*Primary Examiner* — Moo Jeong
(74) *Attorney, Agent, or Firm* — Innovation Capital Law Group, LLP; Vic Lin

(57) ABSTRACT

A scalable hierarchical low latency communication network architecture is disclosed. This architecture uses a novel multi-node, multi-packet block acknowledgement (ACK) wireless communication method. The method is used in a scalable hierarchical architecture for a non-transitory computer readable storage medium storing one or more programs. The one or more programs comprising instructions to perform the following steps: receive multiple data and control packets at a central hub from multiple nodes; create a single ACK packet for the multiple data and control packets received at the central hub from the multiple nodes; and communicate the single ACK packet that acknowledges reception of the multiple data and control packets to the multiple nodes.

17 Claims, 8 Drawing Sheets

Related U.S. Application Data filed on Sep. 30, 2016, provisional application No. 62/402,951, filed on Sep. 30, 2016, provisional application No. 62/402,958, filed on Sep. 30, 2016.

(51) Int. Cl.
*H04L 1/16* (2006.01)
*G06F 3/01* (2006.01)

(56) References Cited

U.S. PATENT DOCUMENTS

| | | | |
|---|---|---|---|
| 2009/0175216 A1* | 7/2009 | Bozarth | H04L 41/22 370/328 |
| 2012/0314639 A1* | 12/2012 | Shiotani | H04W 72/0426 370/311 |
| 2016/0198460 A1* | 7/2016 | Zhang | H04L 1/1671 370/337 |
| 2017/0111711 A1* | 4/2017 | Deuel | H04N 21/454 |

* cited by examiner

1500

METHODS AND SYSTEMS FOR LOW LATENCY WIRELESS COMMUNICATION WITH A SCALABLE HIERARCHIAL ARCHITECTURE

PRIOR APPLICATIONS

This application claims priority to and incorporates by reference in its entirety U.S. Provisional Application Ser. No. 62/402,916 entitled "A NOVEL MULTI-NODE MULTI-PACKET BLOCK ACKNOWLEDGEMENT FOR WIRELESS COMMUNICATION NETWORKS" filed on Sep. 30, 2016; U.S. Provisional Application Ser. No. 62/402,936 entitled "A BEACON BASED WIRELESS LOW LATENCY NETWORK AND METHOD"; U.S. Provisional Application Ser. No. 62/402,951 entitled "METHOD AND SYSTEMS FOR LOW LATENCY WIRELESS COMMUNICATION WITH A SCALABLE HIERARCHICAL ARCHITECTURE"; and U.S. Provisional Application Ser. No. 62/402,958 entitled "A MULTIBAND WIRELESS COMMUNICATION DEVICE AND NETWORK" by the same inventor(s).

COPYRIGHT NOTICE

This disclosure contains material which is subject to copyright protection. The copyright owner makes no objection to reproduction of this disclosure as disclosed in the Patent and Trademark Office files, record, or the like. Otherwise, the copyright owner reserves all copyright rights whatsoever for this patent disclosure. 37 CFR 1.71(d).

BACKGROUND OF THE DISCLOSURE

The following information may be useful in a better understanding of this disclosure. Please note that information contained in this section is not an admission that the information provided is material or prior art to this disclosure or as described in claimed disclosure, or that any publication or document that is specifically, implicitly or otherwise referenced is prior art.

1. Field of the Disclosure

The inventive device disclosed in the present application generally relates to network protocols, and more specifically, a multi-band beacon signal based low latency wireless communication network with a scalable hierarchical architecture, which use a novel multi-node multi-packet block acknowledgment mechanism to reduce communication latency. Ordered transmissions of packets inside the communication system are used to reduce the collisions as well as latency.

2. Description of the Related Art

In wireless communication network, when a sender sends a packet to a receiver, the receiver needs to acknowledge the reception of the packet by sending back an acknowledgment (ACK) packet to the sender. The ACK packet adds overhead to the communication. It increases communication latency and reduces the throughput of the whole network. In addition, when there are multiple senders are sending packets over the air, there could be collision. The collision will make the communication latency and throughput of the network even worse.

Generally speaking, wireless communication network is not scalable. In a large wireless communication network which consists of a plethora of small wireless networks, collision is a major concern. The collision can happen when multiple nodes in the same small network attempt to send packets at the same time or at a substantially similar time. It can also happen when multiple nodes from different small networks are trying to transmit packets at the same time or at a substantially similar time.

Our proposed low latency network (or reduced latency network) has a star topology. The star topology is widely used in many wireless communication standards and networks, like WIFI, Zigbee, and Bluetooth [1, 2, and 3]. FIG. 1 shows a star topology wireless network which consists of one hub (the central node) and 8 nodes. All the nodes are connected to the hub wirelessly. The reduced latency network uses a super frame structure to synchronize the communications between the hub and nodes, as shown in FIG. 2. Usually, the super frame structures are based on beacon signal. Each super frame structure starts with a beacon signal transmitted from the hub. The nodes listen to the beacon signal and transmit after the beacon signal. FIG. 3 shows a conventional beacon signal based super frame structure used in Zigbee and 802.15.4 systems [3]. For every packet that sent to the hub, it follows an ACK packet which limits the throughput of the network and it also increases the communication latency.

The most common ACK mechanism is shown in FIGS. 4 (a) and (b). In FIG. 4(a), for every packet sent to the hub from a node, the hub replies with an ACK packet to acknowledge the correct reception of the packet sent from the node to the hub. In FIG. 4(b), for every packet sent to a node from the hub, the node replies with an ACK packet to acknowledge the correct reception of the packet sent from the hub to the node. The ACK packet adds overhead to the communication. It increases communication latency and reduces the throughput of the whole network.

To reduce the number of ACK packets, in 802.11n WIFI [2], people proposed a block acknowledgement mechanism shown in FIG. 5. Instead of transmitting an individual ACK for each packet from the same node, the hub acknowledges multiple packets together by using a single ACK packet. That acknowledgement mechanism is called block ACK, and it is used in IEEE802.11n [2].

As such, WIFI 802.11n tries to solve the latency and throughput issue by using block acknowledgement. But the block ACK is used to confirm the reception of multiple packets from the same sender to a receiver by a single ACK packet.

As shown in FIG. 5, the block ACK mechanism reduces the ACK overhead to confirm the reception of multiple packets from the same sender to a receiver. If the multiple packets are from different senders, the receiver still needs to send out multiple ACK packets, which increase the communication latency and reduce the throughput of the network, as shown in FIG. 6.

Zigbee and 802.15.4 introduces beacon signal based super frame structure architecture to reduce the collision. But it fails to address the overhead introduced by acknowledgement packets.

So far, there is no a solid way to address the collision inside a large wireless network which consists of several smaller networks.

Many communication systems, especially, many low throughput communication systems, work only on a single band or a pre-assigned single band. For example, Bluetooth [1] only supports communication over the 2.4 GHz ISM band.

Compared with the ISM 5.8 GHz band and other bands, the 2.4 GHz is an interference-heavy and busy band. WIFI, cordless phones and some appliances use the ISM 2.4 GHz band. All the interferences from them will cause issues which include packet loss, retransmissions and high latency, for the wireless communication over the 2.4 GHz band.

The References referred throughout are shown below:
[1] Bluetooth core specification, https://www.bluetooth.com/specifications/bluetooth-core-specification
[2] IEEE 802.11: Wireless LAN Medium Access Control (MAC) and Physical Layer (PHY) Specifications
[3] IEEE 802.15.4: IEEE Standard for Local and metropolitan area networks—Part 15.4: Low-Rate Wireless Personal Area Networks (LR-WPANs)

With the emerging virtual reality and augment reality technologies (VR and AR), low latency wireless communication becomes more and more important.

In the past, people may have not realized the importance of low latency wireless communication as in today. Other than VR and AR, low latency wireless communications are also crucial for gaming, real-time feedback control systems, and real-time monitoring systems. Thus, it is desirable to reduce latency in communication networks.

In the past, people may have not realized the importance of supporting multi-band even for communication network systems with low throughput. People used to think that low throughput means high latency. However, that is not true anymore for wireless communication in VR/AR systems, real-time feedback control systems, and real-time monitoring systems. These systems need to transfer small amount of sensor/state/control data in real-time with low latency. In a busy and noisy environment, interference can adversely affect the latency. Thus, it is desirable to support multiple-band communications even for a low throughput system in order to let the system automatically to pick a band with less interference. For example, it is desirable to have a mechanism to support the low latency wireless communication over all ISM bands (the industrial, scientific and medical bands), such as the 2.4 GHz, 5.8 GHz, 915 MHz, 433 MHz bands, and non-ISM bands as well.

Within this disclosure, please note that all referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The embodiment may seek to satisfy one or more of the above-mentioned desires. Although the below disclosed embodiments may obviate one or more of the above-mentioned desires, it should be understood that some aspects of the embodiments might not necessarily obviate them.

BRIEF SUMMARY OF THE DISCLOSURE

The inventive device disclosed in the present application generally relates to network protocols, and more specifically, a beacon signal based low latency scalable hierarchical wireless network, which use a novel multi-node multi-packet block acknowledgment mechanism to reduce communication latency. This low latency wireless network can operate at multi-bands in order to avoid the interference as much as possible.

The general purpose of the present disclosure, which will be described subsequently in greater detail, is a low latency scalable hierarchical wireless network which uses a novel multi-node, multi-packet block acknowledgment mechanism. The hierarchical network consists of a plurality of beacon signal based reduced latency networks with star topology. Each beacon signal based reduced latency network may operate at a different sub-band of a wireless band or multiple wireless bands. The low latency hierarchical network can be used in many systems, such as gaming systems, Virtual/Augment Reality systems, real-time feedback control systems, data/status monitoring systems, and medical monitoring systems.

The basic building unit of the low latency hierarchical network is a beacon signal based reduced latency network. We first describe the beacon signal based reduced latency network. Then, we will describe the hierarchical network. We will also describe the channel access methods in the hierarchical network in order to avoid the interference as much as possible.

In one aspect of an embodiment, a multi-node, multi-packet block acknowledgement (ACK) wireless communication method with scalable hierarchical architecture is disclosed for a non-transitory computer readable storage medium storing one or more programs. The one or more programs include instructions, which when executed by a computing device, cause modules of the computing device to perform the following steps: receive multiple data and control packets at a central node or a central hub from multiple nodes; create a single ACK packet for the multiple data and control packets received at the central hub or the central node from the multiple nodes; and communicate the single ACK packet that acknowledges reception of the multiple data and control packets to the multiple nodes.

It is still further contemplated that this embodiment includes one or more of the following steps and/or limitations; namely, multiplex together other information and messages with ACK information to the received multiple data and control packets to form one single packet, and communicate the other information and the messages with the ACK information to the multiple nodes as part of the single packet;

communicate the ACK information as part of a beacon signal transmitted from the central node or the hub to the multiple nodes;

transmit a beacon signal at the beginning of a super frame structure from the central hub or the central node to the multiple nodes; listen by the multiple nodes in each super frame structure; synchronize communications between the central node or the central hub and the multiple nodes using the super frame structure responsive to the beacon signal; and communicate one or more acknowledgements (ACKs) information as part of the beacon signal to the multiple nodes;

wherein synchronizing communications includes avoiding data collisions when the multiple nodes attempt to send the multiple data and control packets to the central hub or the central node at a same time or a substantially similar time;

communicate the one or more acknowledgements (ACKs) information of the multiple data and control packets as part of the beacon signal to the multiple nodes;

communicate other ACK signals, synchronization signals, and data and information as part of the beacon signal to the multiple nodes;

communicate one or more acknowledgements (ACKs) inside the beacon signal to the multiple nodes to inform a reception status of the data and information received through the control packets sent to the central hub or the central node; and communicate the one or more acknowledgements (ACKs) information of the multiple data and control packets as part of the beacon signal to multiple nodes by at least one of a phone, a tablet, a personal computer, and a computing device that serves as the hub.

In yet another aspect of an embodiment, a method is disclosed for a non-transitory computer readable storage medium storing one or more programs. The one or more programs include instructions for transmitting a beacon signal by a hub to the multiple nodes of a wireless network, which when executed by a computing device, cause modules of the computing device, to perform the following steps: listen by each node of the multiple nodes and synchronizing communication to the beacon signal; take turns by each node communicating packets to the hub in each super frame; and communicate in an order from each node determined by the order when each node joined the wireless network or determined by an assigned order from the hub.

It is still further contemplated that this embodiment includes one or more of the following steps and/or limitations; namely, acknowledge by the multiple nodes reception of data and information transmitted from the hub along with other data and information; communicate data and information to the hub; and transmit a packet to the hub from a node contain ACK information used to acknowledge the reception of the data and information inside the beacon signal transmitted from the hub to the multiple nodes;

transmit the packets from the multiple nodes containing acknowledgements (ACKs) to inform the reception of data and information received from the beacon signal;

take turns by each node communicating packets to the hub includes take turns by two nodes communicating packets to a mobile phone that serves as the hub; and take turns by each node communicating packets to the hub includes take turns by two nodes communicating the packets to a tablet, or personal computer, or a computing device that serves as the hub.

In yet another aspect of an embodiment, a computer server, memory, I/O port, and a processor configured to execute a super frame structure, the super frame structure to synchronize the communications between a central hub and multiple nodes, wherein: each super frame starts with a beacon signal transmitted from the central hub; the nodes listen to the beacon signal transmitted from the central hub and talk to the central hub in turn in each super frame; and a beacon signal based super-frame communication architecture using the multi-node multi-packets block acknowledgement mechanism that achieves reduced latency communication and avoids data collision when multiple nodes send packets to the central hub at a same time or at a substantially similar time.

It is still further contemplated that this embodiment includes one or more of the following steps and/or limitations; namely, at least one or more of the following:

the one or more acknowledgements (ACKs) information for the data packets transmitted from the multiple nodes is communicated as part of the beacon signal to the multiple nodes;

synchronization signals, data and information, and other signals for the multiple node are communicated as part of the beacon signal to the multiple nodes; and one or more acknowledgements (ACKs) are communicated inside the beacon signal to the multiple nodes to inform a reception status of multiple data and information received through the control packets sent to the central hub or the central node.

In yet another aspect of an embodiment, a hierarchical low latency network is a communication network that is disclosed including: a super hub, a plethora of reduced low latency networks defined in claim 15, and a plethora of nodes which are directly connected to the super hub. Each reduced latency network may have a different number of nodes.

In one embodiment, each of the reduced low latency networks and the super hub operate at a different wireless sub-band or whole band; a first reduced latency network operates at sub-band 1 or whole band 1; a second reduced latency network at sub-band 2 or whole band 2; a third reduced latency network at sub-band 3 or whole band 3; and . . . a Nth reduced latency network at sub-band N or whole band N; and the super hub is configured to communicate to all the reduced latency networks and the nodes directly associated with the super hub at sub-band N+1 or whole band N+1. Each of the sub-bands are different from each other. In another embodiment, some of the sub-bands are the same, and some of them are different. Each of the whole bands are different. In another embodiment, some of the whole-bands are the same, and some of them are different.

As described herein, it is to be understood that not necessarily advantages, and novel features may be achieved in accordance with any one particular embodiment of the disclosure. Thus, the disclosure can be embodied or carried out in a manner that optimizes or achieves one or a group thereof of advantages as taught herein without achieving many or all advantages as may be taught or suggested. Features of the disclosure which are believed to be novel are distinctly claimed in the specification. It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

BRIEF DESCRIPTION OF THE DRAWINGS

The figures which accompany the written portion of this specification illustrate embodiments and method(s) of use for the present disclosure, a beacon signal based super frame structure which uses a novel multi-node multi-packet block acknowledgment mechanism, constructed and operative according to the teachings of the present disclosure.

The various embodiments of the present disclosure will hereinafter be described in conjunction with the appended drawings, wherein like designations denote like elements.

DETAILED DESCRIPTION

Figure 1:
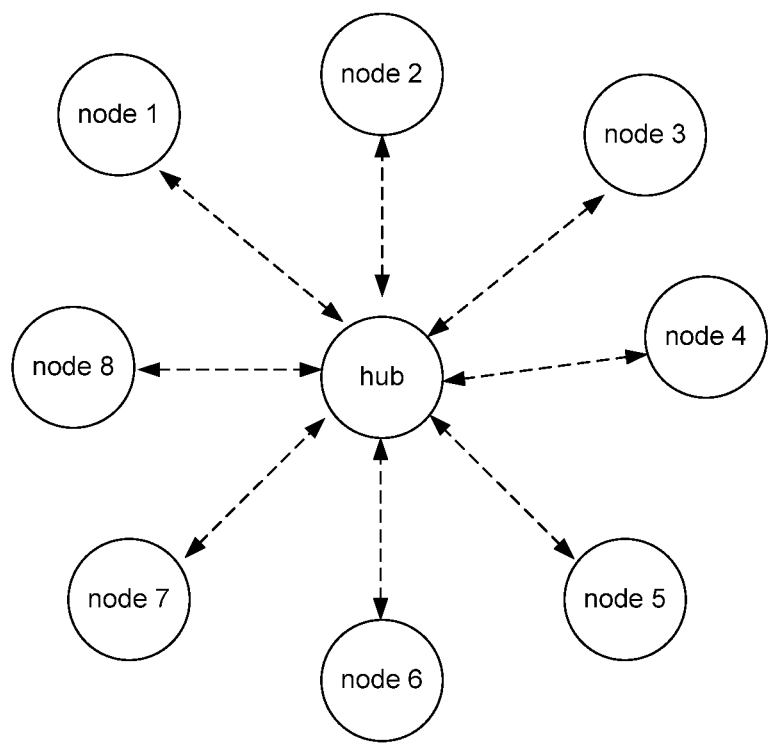
FIG. 1 illustrates a star topology network with a hub (the central node) and 8 nodes.
Figure 2:
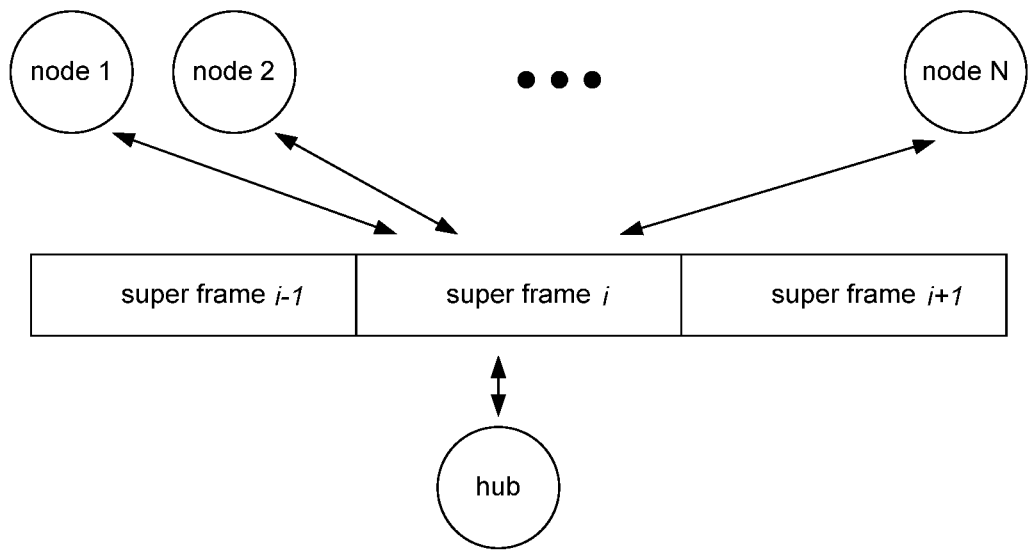
FIG. 2 illustrates a super-frame based star network (with a hub and N nodes where N is a positive integer greater than or equal to 1).
Figure 3:
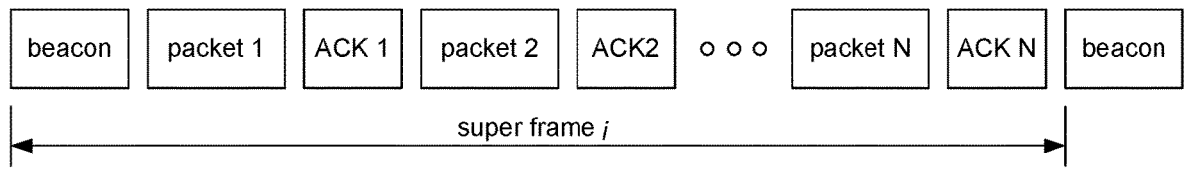
FIG. 3 illustrates a conventional beacon signal based super frame structure.
Figure 4A:
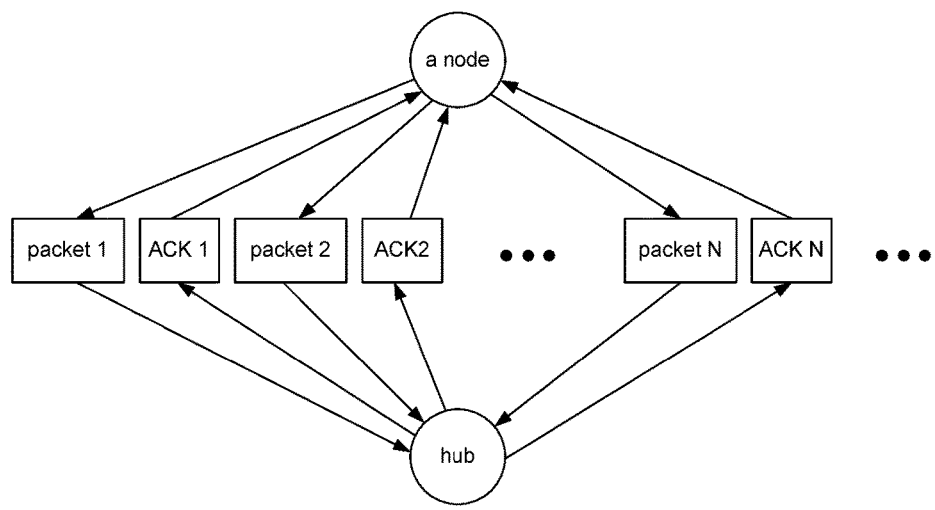
FIG. 4(a) illustrates a network that for each packet sent to the hub from a node, the hub replies with an acknowledgement (ACK) packet to confirm the reception.
Figure 4B:
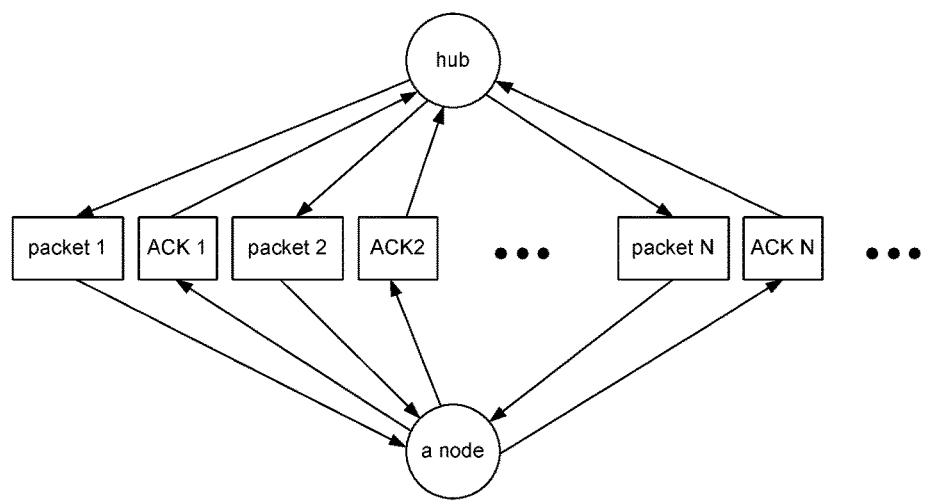
FIG. 4(b) illustrates a network that for each packet sent to a node from the hub, the node replies with an acknowledgement (ACK) packet to confirm the reception.
Figure 5:
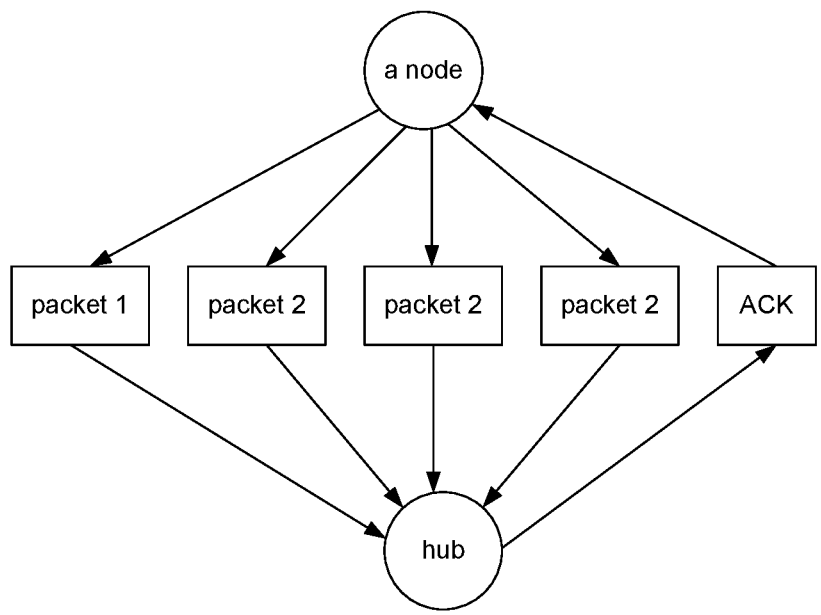
FIG. 5 illustrates a network that the hub replies an acknowledgement (ACK) packet for multiple packets received from the same node.
Figure 6:
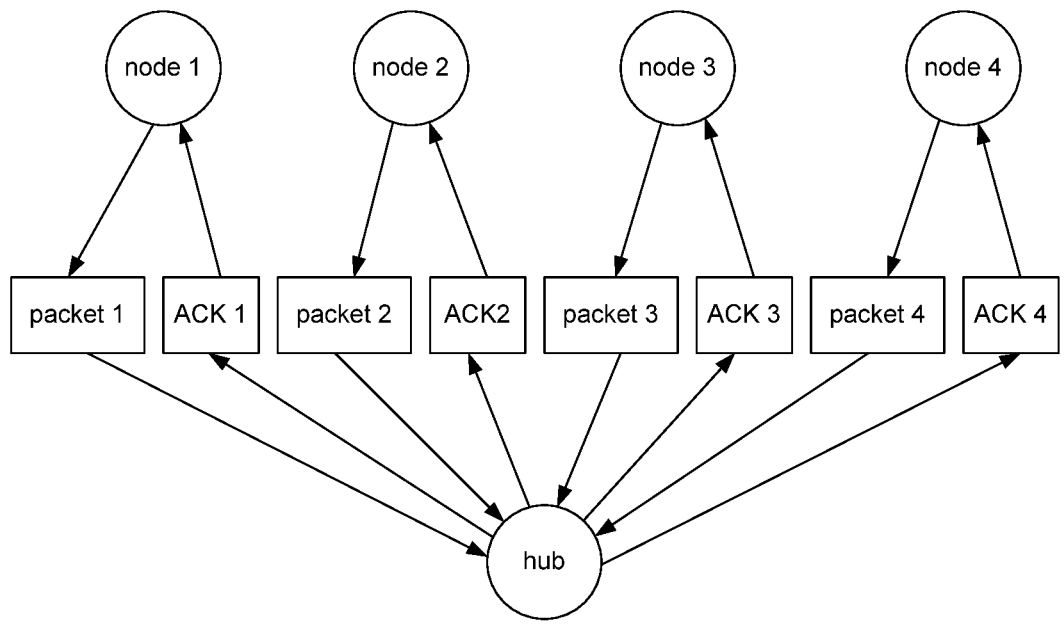
FIG. 6 illustrates a network that if there are multiple packets sent from different nodes, the hub still needs to send back an ACK packet for every packet it receives.

As discussed above, embodiments of the present disclosure application generally relate to wireless communication network for mobile telecommunication apparatus such as tablets, mobile phone, mobile terminals, and mobile devices and sensors. More specifically, they relate to user-friendly, low latency, wireless network consisting of a central node, e.g., a hub, and a plethora of nodes.

Most generally, in the present disclosure, we will describe a low latency scalable hierarchical wireless network trying to address the above issues. The hierarchical network consists of a plurality of beacon-based reduced latency networks with star topology. Each beacon-based reduced latency network may operate a different sub-band of a wireless band. The low latency hierarchical network can be used in many systems, such as gaming systems, virtual reality systems, augment reality systems, real-time feedback control systems, data/status monitoring systems, and medical monitoring systems.

Reference is now made to the drawings wherein like numerals refer to like parts throughout.

As used herein, the term "wireless" or "wireless network" or "network" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

As used herein, the term "reduced latency" or "low latency" refer without limitation depends on the number of nodes and the data size. For example, if there are four nodes, and the data is of just a few bytes, then "reduced latency" or "low latency" can be less than 1 ms. On the other hand, if there are 20 nodes, and the data between a hub and a node is 100 bytes, then "reduced latency" or "low latency" could be about 20 ms. Most generally, in one or more embodiments, "reduced latency" or "low latency" refers to a range below 1ms to a few tens of ms.

As used herein, the term "nodes" or "node" refers to a user device, e.g., laptop, mobile phone or device or sensor, or the like that would like to communicate with or between a network or a hub and one or more user devices.

Referring to the drawings by numerals of reference there is shown in FIGS. 7-15, a low latency scalable hierarchical wireless network, e.g., system, that can be used for the communication between the nodes and the central controller or the hub in many systems, such as gaming systems, virtual reality and augment reality systems, real-time feedback control systems, data/status monitoring systems, medical monitoring systems, and the like.

Figure 7:
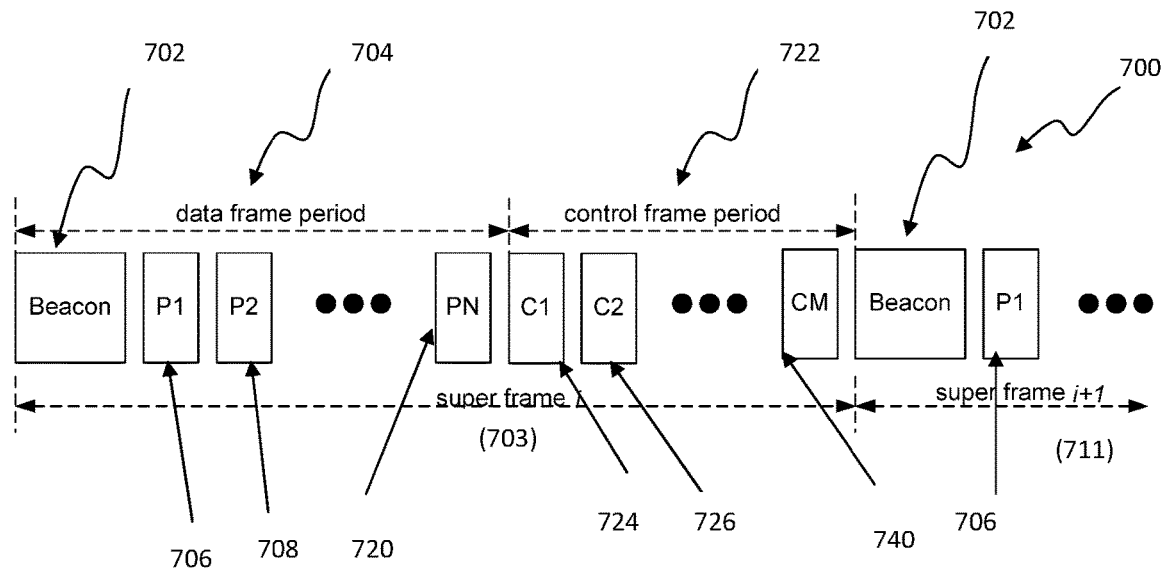
FIG. 7 illustrates a beacon signal based super-frame structure of the present disclosure wherein P1 denotes packet 1, P2 denotes packet 2 . . . , and PN denotes packet N; C1 denotes control packet 1, C2 control packet 2 . . . , and CM control packet M, and each super frame consists of a data frame period and a control frame period. The control frame period may be not present in some configurations.
Figure 8:
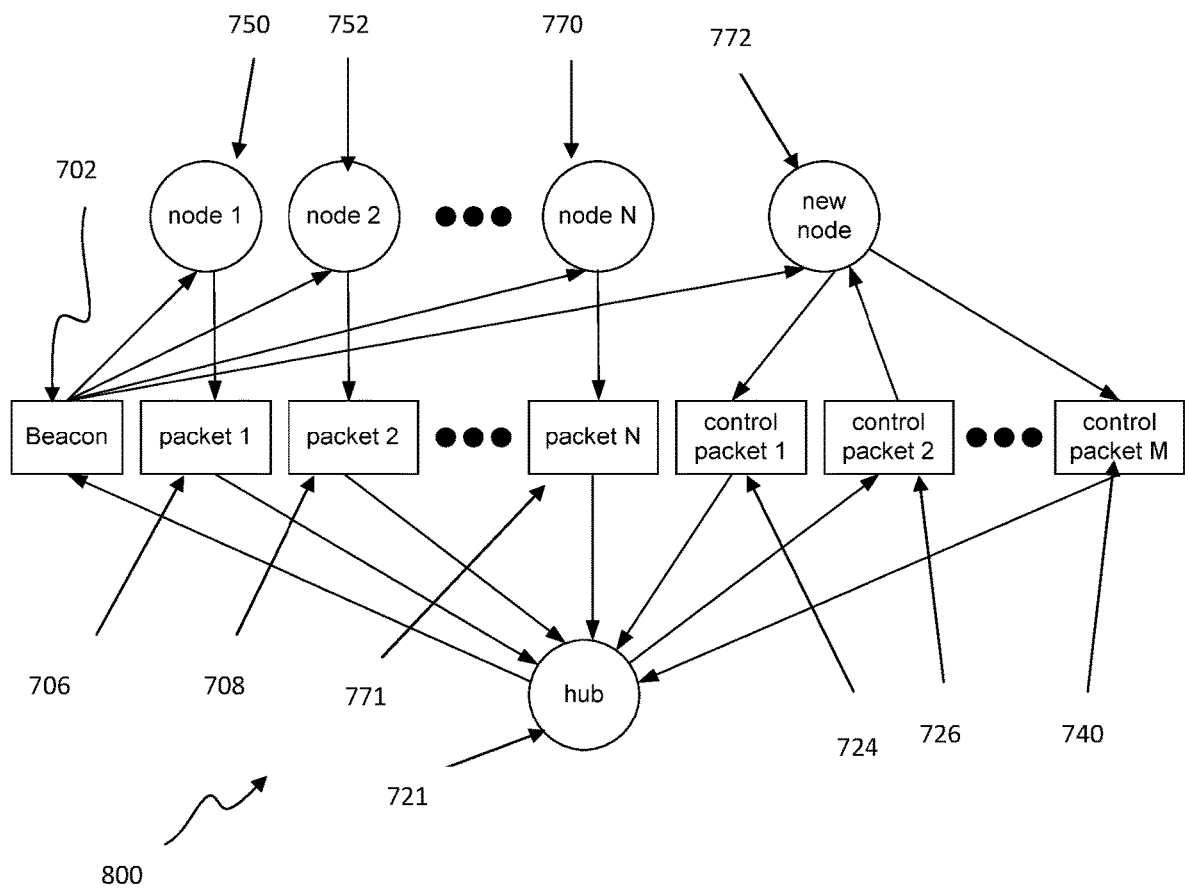
FIG. 8 illustrates the basic beacon signal based reduced latency network and the super-frame structure of the present disclosure.

FIG. 7 illustrates the proposed super frame structure 700 of the proposed reduced latency network. Each super frame in the super frame structure 700 starts with a beacon signal 702 which is transmitted by the hub 721 (as illustrated in FIG. 8). After the beacon signal 702 transmits, there a plethora of packets (706, 708 . . . 720) from nodes 750, 752 . . . 770) (N packets as shown in FIGS. 7 and 8), and a plethora of control packets 724, 726 . . . 740) (M control packets as shown in FIG. 7).

As shown in FIGS. 7 and 8, the beacon signal 702 is transmitted by the hub 721 to the nodes 750, 752 . . . 770, 772. Each node listens and synchronizes to the beacon signal 702, and takes turns transmitting one packet 706, 708 . . . 771, or more packets to the hub 721 in each super frame of the super frame structure 700, e.g., super frame i 703, super frame i+1 711 . . . . The number of packets and the order of transmitting from each node are determined by the order when that node joins the network e.g., network 800. Initially, there is only a hub 721 in the network. The first node 750 that joins the network becomes node 1, and the second node 752 joins the network becomes node 2, the third 754 becomes node 3, and so forth. The ordered transmission avoids the collision when multiple nodes 750 . . . 770, 772 and the like attempt to send packets at the same time or at a substantially similar time.

In some embodiments, the order of transmission may be assigned by a hub 721 wherein a first node 750 joins the network, the hub 721 assigns a number x to the first node 750 which becomes a node with ID (identification) x. A second node 752 joins the network becomes a node with ID y (hub assigns an ID y to that node), and a third node 754 becomes a node with ID z, and so forth. Then, the nodes transmit packets (e.g., packets 706, 708, 710, 712, 714, 716 and the like) according to their assigned number.

In some embodiments, each packet (e.g., packets 706, 708, 710, 712, 714, 716 and the like) from a different node (e.g., nodes 750, 752, 754, 756 . . . 770, 772) may have different length or duration. In some embodiments, the beacon signal 702 may contain information regarding the length or the duration of each packet (e.g., packets 706, 708, 710, 712, 714, 716 and the like). In some embodiments, in a different way, the length or the duration of each packet (e.g., packets 706, 708, 710, 712, 714, 716 and the like) may be assigned when a node (e.g., nodes 750, 752, 754, 756 . . . 770, 772) joins a network.

In some embodiments, a node (e.g., nodes 750, 752, 754, 756 . . . 770, 772) may transmit more than one packet (e.g., packets 706, 708, 710, 712, 714, 716 and the like) in each super frame of the super frame structure 700. The beacon signal 702 may contain information regarding the number of packets (e.g., packets 706, 708, 710, 712, 714, 716 and the like) that a node (e.g., nodes 750, 752, 754, 756 . . . 770, 772) can transmit in a super frame. In some embodiments, the number of packets (e.g., packets 706, 708, 710, 712, 714, 716 and the like) that a node (e.g., nodes 750, 752, 754, 756 . . . 770, 772) can transmit may be assigned when the node (e.g., nodes 750, 752, 754, 756 . . . 770, 772) joins the network.

In some embodiments, the control packets (e.g., control packets 724, 726 . . . 740 and the like) are used for new nodes (e.g., node 772) which are not in the network yet to exchange control information (like admission to the network) with the hub 721. In some embodiments, a node (e.g., nodes 750, 752, 754, 756 . . . 770) which is already in the network can also use the control-frame period 722 to exchange control information or extra data information (including control packets 1 724, control packet 2 726 . . . control packet M 740) with the hub 721.

Figure 9:
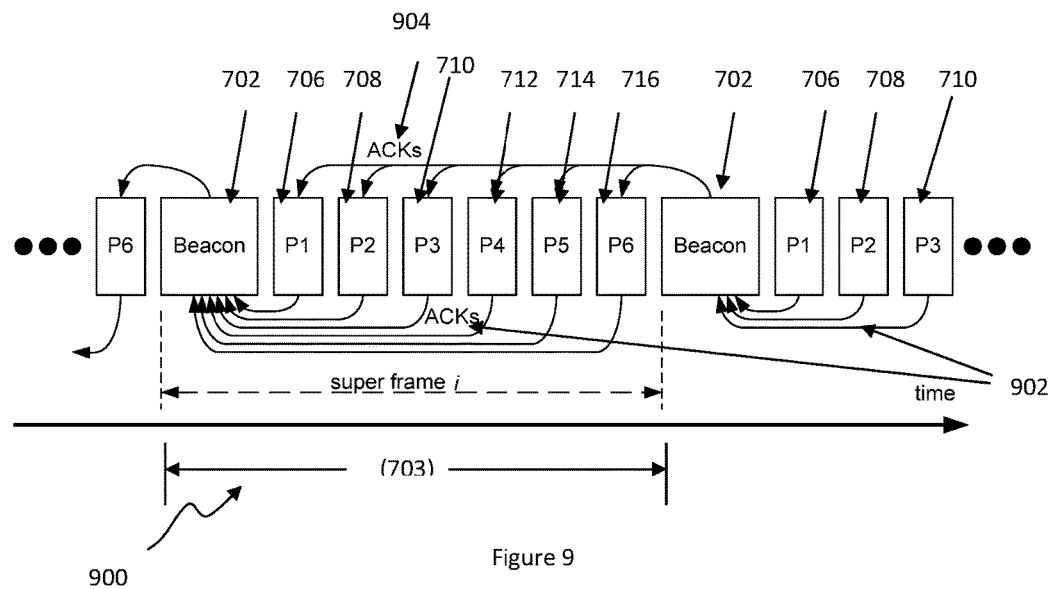
FIG. 9 illustrates a beacon signal packet that contains the ACK information for the packets received by the hub in the previous super frame structure, and, the packets sent from nodes could contain ACK information for the reception of message and data sent from the hub to nodes through beacon signal of the present disclosure.

Referring to FIG. 9, in the proposed reduced latency network, when the hub 721 (See FIG. 8) receives a packet (P1 706-P6 716) from a node (e.g., nodes 750, 752, 754, 756 . . . 770), it does not acknowledge the reception of that packet (P1 706-P6 716) until the beacon signal 702 in the next super frame (e.g., the hub acknowledges in super frame i+1 (711) for the reception of the packets received in super frame i (703) illustrated in FIGS. 7, 8, and 9.). That is, in this embodiment, a beacon signal 702 contains acknowledgement (ACK) 904 information for the packets (P1 706-P6 716) sent to the hub 721 in the previous super frame, as shown in FIG. 9.

Figure 10:
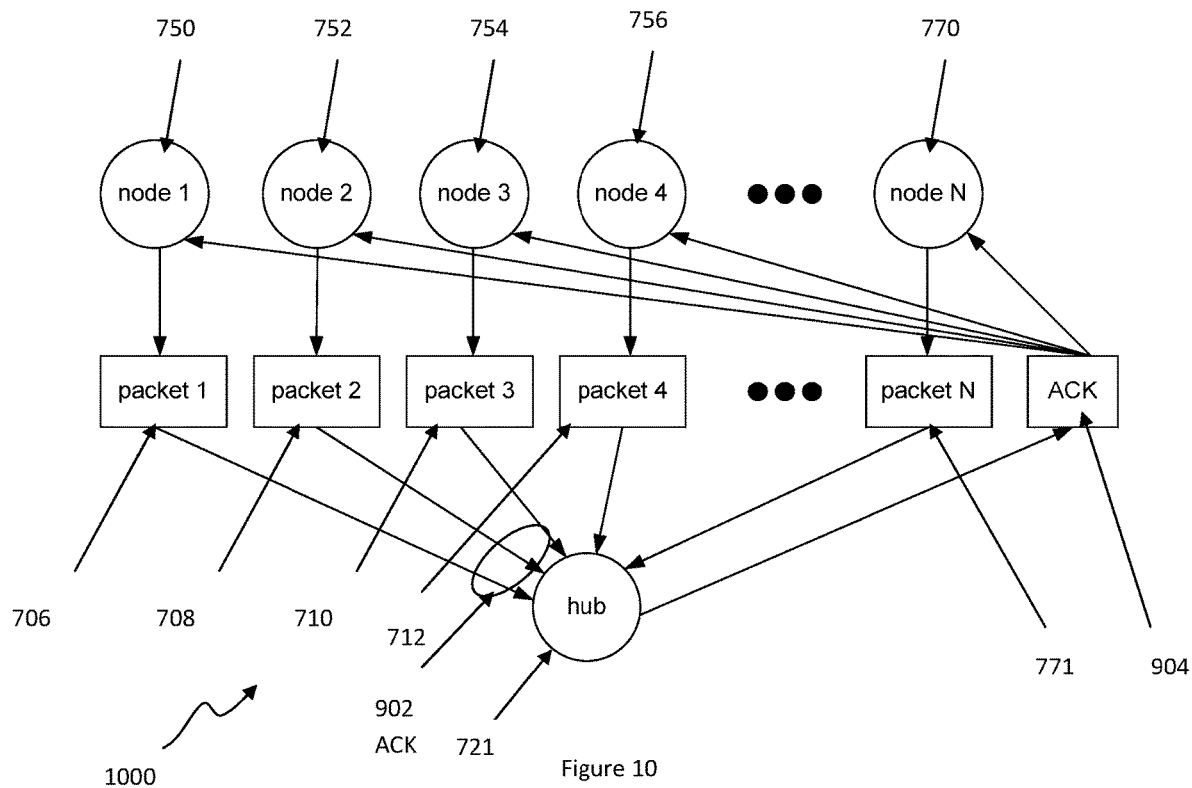
FIG. 10 illustrates a novel multi-node multi-packet (MNMP) block ACK mechanism including: the hub acknowledges the reception of multiple packets from different nodes together by a single ACK packet and that this single ACK could be part of a beacon signal in the super frame structure of the present disclosure.

In summary, the central node (hub) 721 acknowledges the reception of multiple packets 706, 708, 710, 712 . . . 771 from different nodes 750, 752, 754, 756 . . . 770 together by a single ACK packet 904 as shown in FIG. 10. We call this acknowledgment mechanism as multi-node, multi-packet, block acknowledgment mechanism.

In the present disclosure, the single ACK (multi-node multi-packet block ACK) 904 inside the beacon signal 702 differentiates us from the common acknowledgement mechanisms used in many wireless communication networks [1], [2], and [3].

In some embodiments, the beacon signal 702 may contain data and information for the nodes 750, 752 . . . 770, 772. In some embodiments, the acknowledgement of reception of those data and information is transmitted to hub 721 (e.g., ACK 902 is acknowledgement of reception from nodes to hub) along with other data and information in the packets from nodes (e.g., nodes 750, 752 . . . 770, 772) to the hub 721 (as illustrated in FIGS. 8, 9 and 10). That is, the packets transmitted from nodes (e.g., nodes 750, 752 . . . 770, 772) also contain acknowledgement of the reception of data and information received from the beacon signal 702, as shown in FIG. 9.

Please note that ACK 904 is used for acknowledgement from hub to nodes and ACK 902 is used for acknowledgement from nodes to hub.

Figure 11:
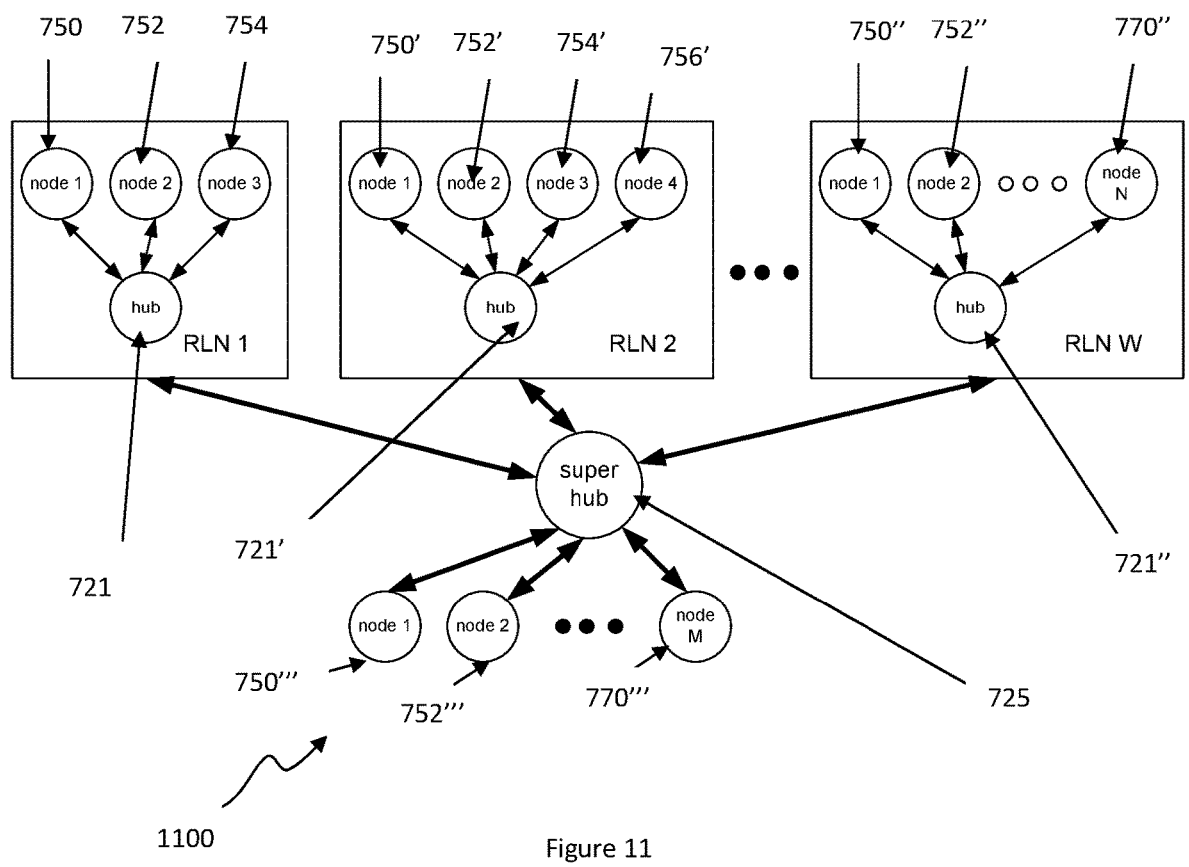
FIG. 11 illustrates a hierarchical low latency network that includes a plethora of (W) RLNs (reduced latency networks), and a plethora of (M) nodes, and a super hub of the present disclosure.

In some embodiments, the hierarchical low latency network (HLLN) consists of super hub 725, and a plethora of beacon based reduced latency networks: Reduced Latency Network 1 (RLN1) having nodes 750, 752, 754 and hub 721; Reduced Latency Network 2 (RLN2) having nodes 750', 752', 754', 756', and hub 721'; and Reduced Latency Network 3 (RLN3) having nodes 750", 752", and 770"), and a plethora of nodes (e.g., nodes 750''', 752''' . . . 770''') which are directly connected to the super hub 725 as shown in FIG. 11. Each reduced latency network (RLN) (e.g., RLN 1, RLN 2 . . . RLN W) may have a different number of nodes.

In some embodiments, the channel access methods of the hierarchical low latency network combine TDMA (time-division multiple access, that is the ordered transmission within a beacon signal based reduced latency network), FDMA (frequency-division multiple access) and frequency hopping.

Figure 12:
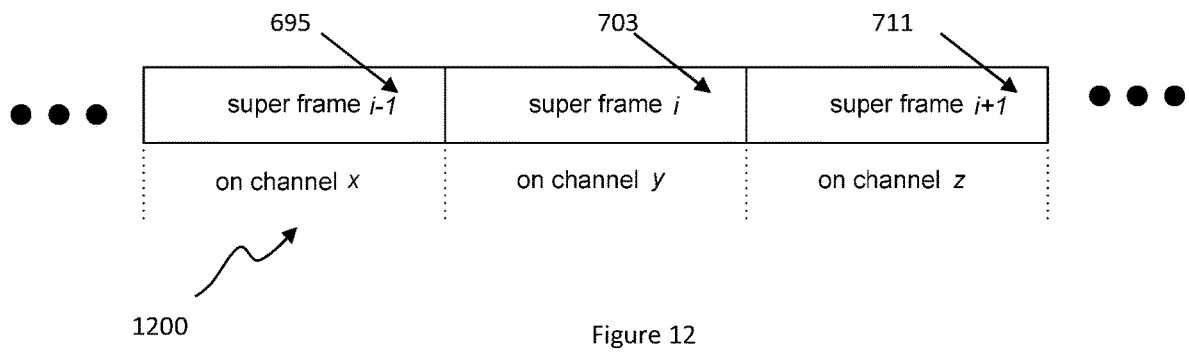
FIG. 12 illustrates frequency hopping: Super frame i−1 is on channel x; super frame i is on channel y; and super frame i+1 on channel z of the present disclosure.
Figure 13:
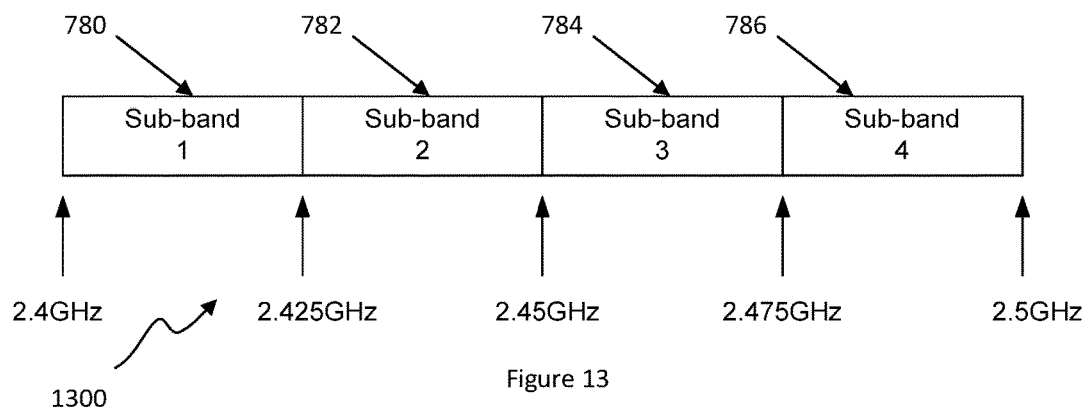
FIG. 13 illustrates an example of sub-bands wherein the 2.4 GHz ISM band is divided into 4 sub-bands of the present disclosure.
Figure 14:
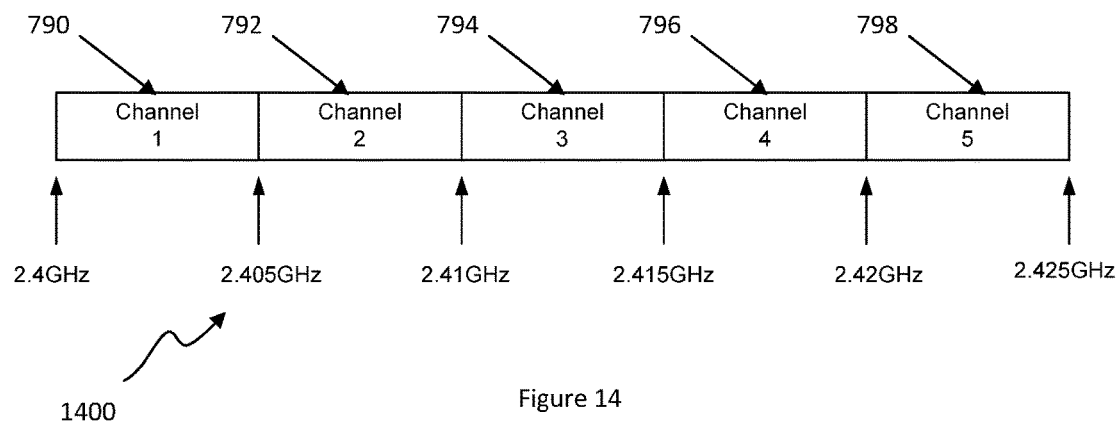
FIG. 14 illustrates an example of dividing a sub-band into multiple channels of the present disclosure.

In some embodiments, the basic reduced latency network is based on time-division multiple access (TDMA), combined with frequency hopping. During a super-frame, the nodes (750, 752 . . . 770) take turns to talk to the hub (the central node) as shown in the FIG. 8 and FIG. 9, using the same wireless channel as shown in FIG. 12. All the nodes (including the new nodes which want to talk to the hub) should listen to the beacon signal 702 transmitted by the hub 721. The beacon signal 702 establishes the timing for all the end nodes when they shall transmit.

To minimize the interference from other wireless network which may use a fixed channel for different super-frames, the communication between the hub and the nodes use different channels. In some embodiments, on a new super-frame, the wireless channel may hop to a different frequency as shown in FIG. 12. For example, the frequency hopping is a pre-defined sequence or a pseudo sequence indicated by a beacon signal 702 or is established when the network is formed; namely, super frame i−1 695 on channel x, super frame i 703 on channel y, and super frame i+1 711 on channel z.

The wireless bands, for example, the 2.4 GHz and 5.8 GHz ISM bands, may be divided into a plethora of sub-bands. Each sub-band occupies a certain range of frequency ranges. For example, in FIG. 13, we divide the 2.4 GHz ISM band into 4 sub-bands (Sub-band 1 780 (2.4 GHz-2.425 GHz), Sub-Band 2 782 (2.425 GHz-2.45 GHz), Sub-band 3 784 (2.45 Ghz-2.475 GHz), and Sub-band 4 786 (2.475 GHz-2.5 GHz). Each sub-band occupies a frequency range of 25 MHz. Each sub-band (e.g., Sub-Band 1 78) can be divided into multiple channels (e.g., Channel 1 790, Channel 2 792, Channel 3 794, Channel 4 796, Channel 5 798) further as shown in the example in FIG. 14. In this example, we divide the sub-band 1 in the FIG. 13 into five channels.

In yet another embodiment of the present disclosure, a basic reduced latency network is disclosed that operates at a sub-band of a wireless band or at the whole band. In one example, the different nodes talk to the hub through a time-division multiple access. In some embodiments, the hierarchical low latency network which consists of plethora of basic reduced latency networks, a combination of TDMA and FDMA is used . . . . Each of the basic reduced latency networks (RLN 1, RLN 2 . . . RLN W where W is a positive integer greater than or equal to 1) operates at different sub-band or a whole band. For example, RLN 1 operates at sub-band 1, RLN 2 at sub-band 2; . . . ; and RLN W at sub-band W. In some embodiments, the super hub talks to all the reduced latency networks and the nodes directly associated with the super hub through a different a sub-band (sub-band W+1).

The combined TDMA and FDMA avoids the collision between the nodes inside each RLN. At the same time, it avoids the collision between nodes from different basic reduced latency networks.

The hub and or super-hub may scan the wireless bands from time to time, and pick up the band and sub-bands with less interference for data communications.

The References referred throughout are shown below:
[1] Bluetooth core specification, https://www.bluetooth.com/specifications/bluetooth-core-specification
[2] IEEE 802.11: Wireless LAN Medium Access Control (MAC) and Physical Layer (PHY) Specifications
[3] IEEE 802.15.4: IEEE Standard for Local and metropolitan area networks—Part 15.4: Low-Rate Wireless Personal Area Networks (LR-WPANs).

In one or more embodiments above as describe previously, a hierarchical low latency network (HLLN) is disclosed including a super hub, a plethora of beacon signal based reduced latency networks, and a plethora of nodes which are directly connected to the super hub. Each RLN may have a different number of nodes. In a beacon signal based reduced latency network, a super frame structure is configured to synchronize the communications between a hub and nodes. Each super frame structure starts with a beacon signal frame transmitted from the hub. The nodes listen to the beacon signal and talks to the hub in turn in each super frame of the super frame structure; and a beacon signal based super-frame communication architecture configured with a novel multi-node multi packet block acknowledgement mechanism achieves low latency communication and avoids data collision when multiple nodes attempt to send packets to the hub at a substantially similar time.

In the basic reduced latency network, a multi-node multi-packet block acknowledgement method is used. That method includes the step of acknowledging reception of multiple data packets sent to a hub from different nodes. The hub acknowledges the multiple data packets from different nodes together by a single ACK packet. The beacon signal not only contains synchronization and ACK signals, it also contains data and information for each node. Each node acknowledges the reception of these data and information by sending back an ACK along with its data to the hub. The hierarchical low latency network may operate simultaneously at multiple ISM or non-ISM bands or sub-bands of those bands with less interference in order to reduce collision.

Figure 15:
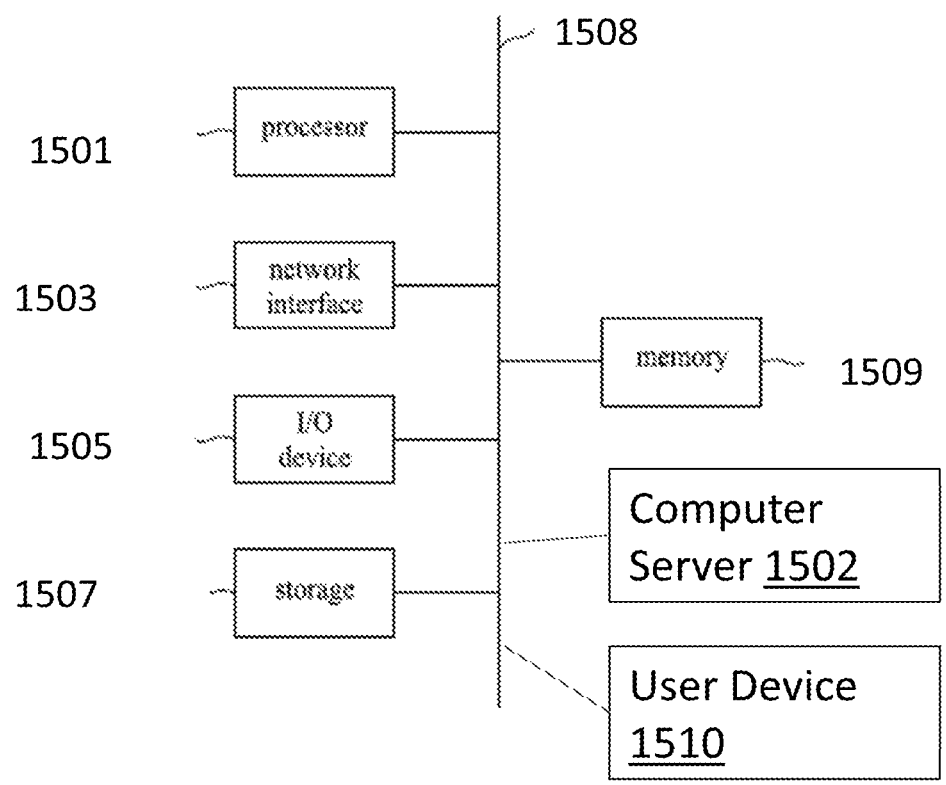
FIG. 15 is a block diagram of a system for the basic beacon signal based reduced latency network and the super-frame structure of the present disclosure in accordance with some embodiments.

FIG. 15 is a block diagram of a system for the basic beacon signal based reduced latency network and the super-frame structure of the present disclosure in accordance with some embodiments.

Referring to FIG. 15, the system 1500 includes a processor 1501, a computer server 1502, a network interface 1503, an input and output (I/O) device 1505, a storage device 1507, a memory 1509, and a bus or network 1508. The bus 1508 couples the network interface 1503, the I/O device 1505, the storage device 1507 and the memory 1509 to the processor 1501.

Accordingly, the processor 1501 is configured to enable the computer server 1502, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 1501, the computer server 1502, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 1502 is configured to utilize the I/O port 1505 communicate with external devices via a network 1508, such as a wireless network. In certain embodiments, the I/O port 1505 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 1502 is configured to utilize the I/O port 1505 to wirelessly communicate with a client device 1510, such as a mobile phone, a tablet PC, a portable laptop or any other computing device with internet connectivity. Accordingly, electrical signals are transmitted between the computer server 1500 and the client device 1510.

In some embodiments in accordance with the present disclosure, the computer server 1502 is a virtual server capable of performing any function a regular server has. In certain embodiments, the computer server 1502 is another client device of the system 1500. In other words, there may not be a centralized host for the system 1500, and the client devices 1510 in the system are configured to communicate with each other directly. In certain embodiments, such client devices 1510 communicate with each other on a peer-to-peer (P2P) basis. The processor 1501 is configured to execute program instructions that include modules configured to perform a method as described and illustrated with reference to FIGS. 7-14. Accordingly, the module is configured to execute the operations including a multi-node, multi-packet block acknowledgement (ACK) wireless communication method with scalable hierarchical architecture for a non-transitory computer readable storage medium storing one or more programs.

In one or more embodiments, the one or more programs comprising instructions, which when executed by a computing device, cause modules of the computing device to perform the following steps comprising: receive multiple data and control packets at a central node or a central hub from multiple nodes; create a single ACK packet for the multiple data and control packets received at the central hub or the central node from the multiple nodes; and communicate the single ACK packet that acknowledges reception of the multiple data and control packets to the multiple nodes.

For example, the method in this embodiment described above may further include any or all the following steps:

(a) multiplex together other information and messages with ACK information to the received multiple data and control packets to form one single packet; communicating the other information and the messages with the ACK information to the multiple nodes as part of the single packet;

(b) communicate the ACK information as part of a beacon signal transmitted from the central node or the hub to the multiple nodes;

(c) transmit a beacon signal at the beginning of a super frame from the central hub or the central node to the multiple nodes; listen by the multiple nodes in each super frame; synchronize communications between the central node or the central hub and the multiple nodes using the super frame structure responsive to the beacon signal; and communicate one or more acknowledgements (ACKs) information as part of the beacon signal to the multiple nodes;

(d) synchronize communications includes avoiding data collisions when the multiple nodes attempt to send the multiple data and control packets to the central hub or the central node at a same time or a substantially similar time;

(e) communicate the one or more acknowledgements (ACKs) information of the multiple data and control packets as part of the beacon signal to the multiple nodes;

(f) communicate other ACK signals, synchronization signals, and data and information as part of the beacon signal to the multiple nodes;

(g) communicate one or more acknowledgements (ACKs) inside the beacon signal to the multiple nodes to inform a reception status of the data and information received through the control packets sent to the central hub or the central node; and (h) communicate the one or more acknowledgements (ACKs) information of the multiple data and control packets as part of the beacon signal to multiple nodes by at least one of a phone, a tablet, a personal computer, and a computing device that serves as the hub.

In one or more embodiments, the one or programs comprising instructions, which when executed by a computing device, cause modules of the computing device to perform the following steps comprising: a method for a non-transitory computer readable storage medium storing one or more programs, the one or more programs comprising instructions for transmitting a beacon signal by a hub to the multiple nodes of a wireless network, which when executed by a computing device, cause modules of the computing device, to perform the following steps the method comprising, listening by each node of the multiple nodes and synchronizing communication to the beacon signal, taking turns by each node communicating packets to the hub in each super frame structure, and communicating in an order from each node determined by the order when each node joined the wireless network or determined by an assigned order from the hub.

For example, the method in this embodiment described above may further include any or all the following steps:

(a) acknowledge by the multiple nodes reception of data and information transmitted from the hub along with other data and information; communicate data and information to the hub; and transmit a packet to the hub from a node containing ACK information used to acknowledge the reception of the data and information inside the beacon transmitted from the hub to the multiple nodes;

(b) transmit the packets from the multiple nodes containing acknowledgements (ACKs) to inform the reception of data and information received from the beacon signal;

(c) take turns by each node communicating packets to the hub includes taking turns by two nodes communicating packets to a mobile phone that serves as the hub; and (d) take turns by each node communicating packets to the hub includes take turns by two nodes communicating the packets to a tablet, or personal computer, or a computing device that serves as the hub.

The network interface 1503 is configured to access program instructions and data accessed by the program instructions stored remotely through a network (not shown).

The I/O device 1505 includes an input device and an output device configured for enabling user interaction with the system 1500. In some embodiments, the input device comprises, for example, a keyboard, a mouse, and other devices. Moreover, the output device comprises, for example, a display, a printer, and other devices.

The storage device 1507 is configured for storing program instructions and data accessed by the program instructions. In some embodiments, the storage device 1507 comprises, for example, a magnetic disk and an optical disk. The memory 1509 is configured to store program instructions to be executed by the processor 1501 and data accessed by the program instructions. In some embodiments, the memory 1509 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 1509 is incorporated into the processor 1501.

It should be noted as herein described in the methods, the steps and/or methods of contemplated use can be carried out in many different ways, procedures, and the like according to, for example, one or more user preference(s). "[S]tep of" should not be interpreted as "step for", in the claims herein and is not intended to invoke the provisions of 35 U.S.C. § 112, ¶ 6.

Upon reading this specification, it should be appreciated that, under appropriate circumstances, considering such issues as user requirements or wishes, design considerations, marketing preferences, cost(s), structural requirement(s), available materials, technological advances, etc., other methods of use arrangements such as, for example, orders within above-mentioned list that are different, eliminated and/or additional steps, including or eliminating, for example, procedure, process, and/or maintenance step(s), etc., may be sufficient.

It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context.

In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, and as described herein are expressly contemplated as being equivalent within the scope of the claims and understood by those knowledgeable in the art. Therefore, obvious substitutions now or later known to one with ordinary skill in the art are defined to be within the scope of the defined elements and the reading of the specification as described herein.

The claims are thus to be understood to include what is specifically illustrated and described above, what is conceptually equivalent, what can be obviously substituted and also what essentially incorporates the essential idea of the embodiment. In addition, where the specification and claims refer to at least one of something selected from the group consisting of A, B, C . . . and N, the text should be interpreted as requiring only one element from the group, not A plus N, or B plus N, etc

What is claimed is:

1. A multi-node, multi-packet block acknowledgement (ACK) wireless communication method comprising:
receiving, in a first super frame of a super frame structure for synchronizing communications, at a central node of a network, a first data and control packet from a first node of the network;
receiving, in the first super frame of the super frame structure, at the central node of the network, additional data and control packets from additional nodes of the network, wherein the first node and the additional nodes are separate devices;
generating, at a computing device implementing the central node, a beacon packet comprising:
a) a first ACK field with a first ACK information that acknowledges reception of said first data and control packet from the first node,
b) additional ACK fields with additional ACK information that acknowledges reception of said additional data and control packets from the additional nodes,
c) information and messages specific for said first node, and
d) information and messages specific for each of said additional nodes; and
transmitting, in a second super frame of the super frame structure, by the central node, the beacon packet to each of the first node and the additional nodes; and
receiving, in the second super frame, at the central node, a packet from the first node that acknowledges reception of said information and messages specific for said first node and a packet from said each of said additional nodes that acknowledges reception of said information and messages specific for said each of said additional nodes;
wherein the first node and the additional nodes include all nodes sending data to the central node in the first super frame.

2. The method of claim 1, wherein synchronizing communications includes avoiding data collisions when the first and additional nodes attempt to send the first and additional data and control packets to the central node at a same time or a substantially similar time.

3. The method of claim 1, further comprising the step of:
communicating said beacon packet to said first node and said additional nodes by at least one of a phone, a tablet, a personal computer, and a computing device.

4. The method of claim 3, wherein the central node is located at a computing device for a virtual reality or augmented reality application, said first node is a first sensor, and said additional nodes are additional sensors.

5. The method of claim 1, wherein an acknowledgement policy of the first and additional data and control packets is set to ACK.

6. A reduced latency network comprising:
a central hub, a first node, additional nodes, a computer server, memory, I/O port, and a processor configured to execute a super frame structure, the super frame structure to synchronize communications between the central hub, the first node, and the additional nodes, wherein:
the first node and the additional nodes represent separate devices;
a first super frame starts with a first beacon packet transmitted from the central hub;
the first node and the additional nodes configured to listen to the beacon packet transmitted from the central hub and talk to the central hub using the super frame structure;
said first and additional nodes configured to respectively send first and additional data and control packets to the central hub at a same time or at a substantially similar time in the first super frame; and the central hub is configured to send, in an immediately sequential super frame of the super frame structure after the first super frame, a second beacon packet which includes:
a) a first ACK field with a first ACK information that acknowledges reception of said first data and control packet from the first nod,
b) additional ACK fields with additional ACK information that acknowledges reception of each of said additional data and control packets from the additional nodes,
c) information and messages specific for said first node, and
d) information and messages specific for each of said additional nodes; and the central hub is configured to receive, in the second super frame, a packet from the first node that acknowledges reception of said information and messages specific for said first node and a packet from said each of said additional nodes that acknowledges reception of said information and messages specific for said each of said additional nodes;

the first node and the additional nodes include all nodes sending data to the central hub in the first super frame.

7. The network of claim 6, further comprising:
synchronization signals, data and information, and other signals specific for each of said first and additional nodes are communicated as part of the beacon packet to the first and additional nodes.

8. The network of claim 7, wherein the first node and the additional nodes are located at a computing device for a virtual reality or augmented reality application, said first node is a first sensor, and said additional nodes are additional sensors.

9. The network of claim 7, wherein a beacon packet is based on a super-frame communication architecture using a multi-node multi-packets block acknowledgement mechanism that achieves reduced latency communication and avoids data collision.

10. The network of claim 7, wherein an acknowledgement policy of the first and additional data and control packets is set to ACK.

11. A hierarchical low latency network, comprising:
a super hub, a plethora of reduced low latency networks as defined in claim 6, and a plethora of nodes which are directly connected to the super hub;
wherein each reduced latency network includes a different number of nodes.

12. The network of claim 11, wherein each of the reduced low latency networks and the super hub operate at a different wireless sub-band of a wireless band or a whole band;
wherein a first reduced latency network operates at sub-band 1 or a whole band 1; wherein a second reduced latency network operates at sub-band 2 or a whole band 2; wherein a third reduced latency network operates at sub-band 3 or whole band 3; and wherein a Nth reduced latency network operates at sub-band N or whole band N; and wherein the super hub is configured to communicate to all the reduced latency networks and the nodes directly associated with the super hub at sub-band N+1 or whole band N+1.

13. The network of claim 12, wherein each sub-band includes at least one of a single wireless band, or sub-bands of multiple wireless bands.

14. The network of claim 12, wherein each of the sub-bands are different from each other.

15. The network of claim 12, wherein some of sub-bands are the same, and some of the sub-bands are different from each other.

16. The network of claim 12, wherein each of the whole bands are different from each other.

17. The network of claim 12, wherein some of whole bands are the same, and
some of the whole bands are different from each other.

* * * * *